(12) United States Patent
Spalink

(10) Patent No.: US 6,816,560 B1
(45) Date of Patent: Nov. 9, 2004

(54) PACKET SYNCHRONIZATION DETECTOR

(75) Inventor: Gerd Spalink, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 754 days.

(21) Appl. No.: 09/610,460

(22) Filed: Jul. 5, 2000

(30) Foreign Application Priority Data

Jul. 6, 1999 (EP) .......................................... 99 113 095

(51) Int. Cl.[7] .............................................. H04L 7/00
(52) U.S. Cl. ...................................................... 375/368
(58) Field of Search ................................ 375/354, 365, 375/366, 368; 370/512, 514

(56) References Cited

U.S. PATENT DOCUMENTS

| | | | |
|---|---|---|---|
| 5,621,773 A | | 4/1997 | Varma et al. |
| 6,118,819 A | * | 9/2000 | Kim ........................... 375/240 |
| 6,272,194 B1 | * | 8/2001 | Sakamoto ................... 375/368 |

FOREIGN PATENT DOCUMENTS

| | | |
|---|---|---|
| DE | 38 33 184 | 4/1990 |
| EP | 0 786 908 | 7/1997 |

\* cited by examiner

*Primary Examiner*—Stephen Chin
*Assistant Examiner*—Kevin Kim
(74) *Attorney, Agent, or Firm*—Frommer Lawrence & Haug LLP; William S. Frommer

(57) ABSTRACT

A packet synchronization detector for an incoming digital signal which includes a regularly repeated predetermined synchronization pattern which repetition rate defines the length of one transmission packet according to the present invention comprises a synchronization pattern detector (1) and several synchronization state machines $(2, 3_1, \ldots, 3_n)$ which respectively determine whether or not one detected synchronization pattern with a respective position in regard to the length of one transmission frame has the correct repetition rate to determine whether or not lock has been achieved. Therefore, a very fast lock is achieved, since also in case of bit patterns that match to the synchronization byte, but that are not the synchronization byte no penalty time occurs to lock to the incoming digital signal.

7 Claims, 4 Drawing Sheets

Sync: Synchronization Pattern present
NoSync: No Synchronization Pattern

Sync: Synchronization Pattern present
NoSync: No Synchronization Pattern

PACKET SYNCHRONIZATION DETECTOR

BACKGROUND OF THE INVENTION

1. Field of the Invention

The present invention relates to a packet synchronization detector according to the preamble of claim 1 and to a method to determine the lock-in to a regularly repeated predetermined synchronization pattern within an incoming digital signal according to the preamble of claim 7.

2. Description of Related Art including information disclosed under 37 CFR 1.97 and 1.98

In general a synchronization pattern, e. g. a synchronization byte, is included in a transmitted bit stream to allow a synchronization of the receiver to this bit stream, i. e. to find byte boundaries and the boundaries of transmission packets or frames. E. g., in integrated DVB channel decoders, a stream of 2, 4, 5, 6, 7 or 8 bit symbols must be converted to a stream of bytes. Therefore, the stream of bit symbols gets first converted to a stream of bits whereafter the byte boundaries are detected on basis of a transmitted synchronization byte which always has the value 0×47 or the respective inversion 0×b8 and is transmitted every 204 bytes, since DVB transmissions always use the MPEG transport packet structure which uses a fixed packet size of 204 bytes.

Current packet synchronization detectors use a single pattern detector that detects the synchronization byte value in the serial bit stream. If such a pattern has been found the patterns n·204 bytes later are checked and a lock-in of the receiver is achieved if these are also synchronization bytes.

The disadvantage of this solution is that there is a high probability that the first matching pattern is not a synchronization byte. In this case there is a penalty time of at least one packet until the search can continue.

Therefore, it is the object of the present invention to provide a packet synchronization detector that achieves a fast lock time to the synchronization byte position as well as to provide a method to operate such a packet synchronization detector.

BRIEF SUMMARY OF THE INVENTION

These objects are achieved by a packet synchronization detector according to claim 1 and a method to determine the lock-in to a regularly repeated predetermined synchronization pattern within an incoming digital signal according to independent claim 7. Preferred embodiments thereof are respectively defined in the respective dependent claims.

According to the present invention a packet synchronization detector comprises a synchronization pattern detector that outputs a control signal whenever the incoming digital signal carries the predetermined synchronization pattern and several parallel synchronization state machines which respectively pursue their own synchronization byte location until lock has been obtained. The lock-in of the system is achieved when the first of those synchronization state machines has locked. Therefore, according to the present invention the time to lock is minimized in case there are as many synchronization state machines as synchronization bytes are detected within one transmission packet or frame, e. g. one MPEG transport packet. A preferred number of synchronization state machines is 16.

This preferred number of 16 synchronization state machines results from the observation that within one DVB transport packet an average of 13 . . . 14 synchronization byte patterns (0×47, 0×b8) is present and that on average 80% of the packets contain 16 or less synchronization byte patterns, whereas 35 synchronization patterns per 204-byte packet seem never to be exceeded.

BRIEF DESCRIPTION OF THE SEVERAL VIEWS OF THE DRAWINGS

The present invention and its advantageous embodiments will be better understood from the following detailed description of an exemplary embodiment thereof taken in conjunction with the accompanying drawings, in which.

DETAILED DESCRIPTION OF THE INVENTION

Figure 1:
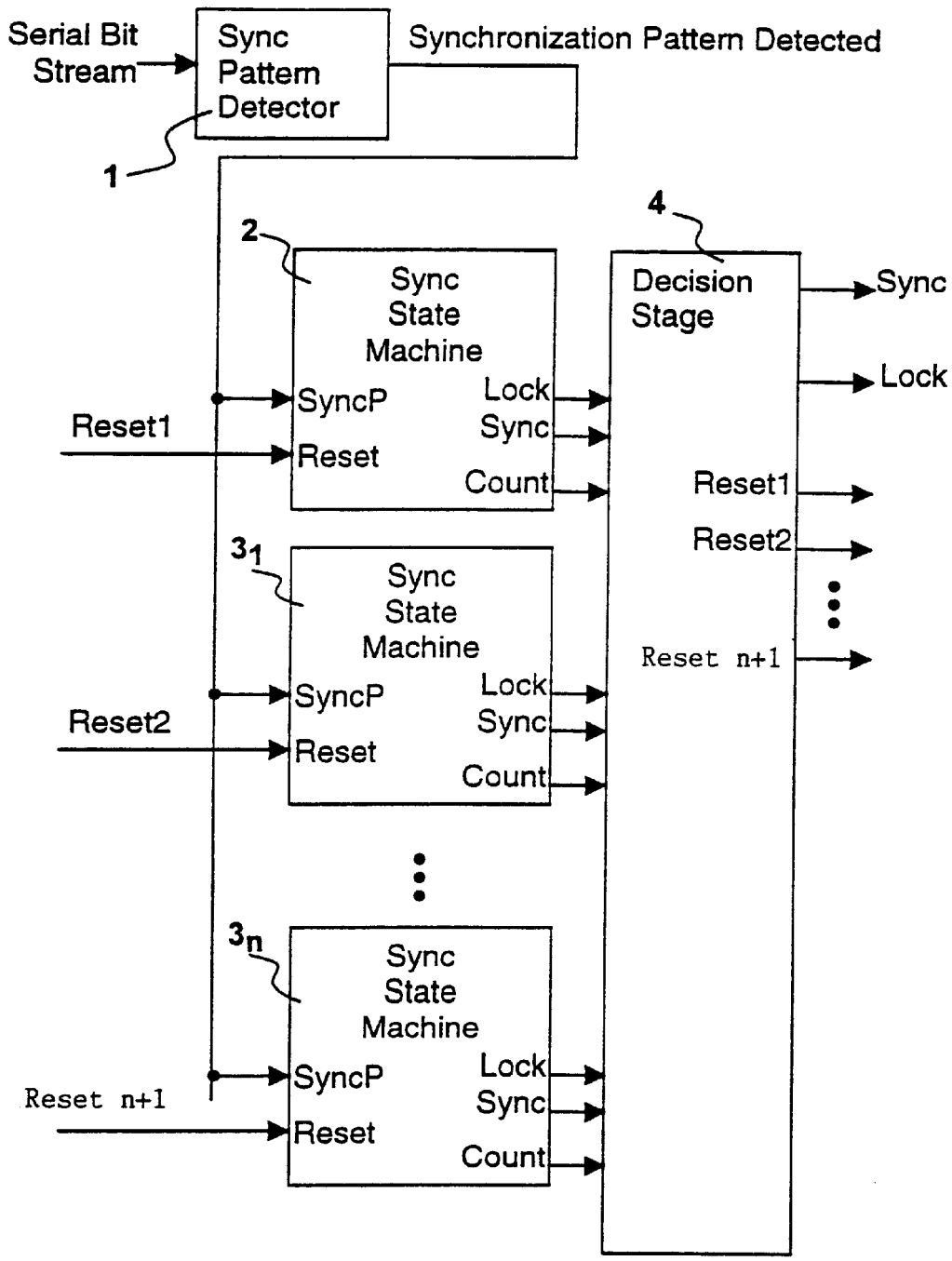
FIG. 1 shows a packet synchronization detector according to an embodiment of the present invention.

FIG. 1 shows an exemplary embodiment of a packet synchronization detector according to the present invention. This detector comprises a sync byte detector 1 receiving an input serial bit stream that outputs a synchronization pattern detected control signal whenever it has detected a synchronization pattern, e. g. a synchronization byte, within the incoming bit stream. This control signal which consists of a synchronization pulse in this embodiment is supplied to a respective synchronization pulse input SyncP of n+1 synchronization state machines 2 and $3_1$ to $3_n$. Every synchronization state machine 2 and $3_1$ to $3_n$ maintains its synchronization state independently and supplies its results to a decision stage 4 which determines which of the synchronization state machines 2 and $3_1$ to $3_n$ is most likely synchronized to the true synchronization byte. The decision stage 4 also controls the resetting of all connected synchronization state machines 2 and $3_1$ to $3_n$ via a respective reset input Reset to stop or re-start a respective synchronization state machine via a separate reset line Reset 1 . . . Reset n+1 to every synchronization state machine.

The functionality of such a fast packet synchronization detector according to the present invention will hereinafter be explained in connection with FIGS. 2 to 6.

Figure 2:
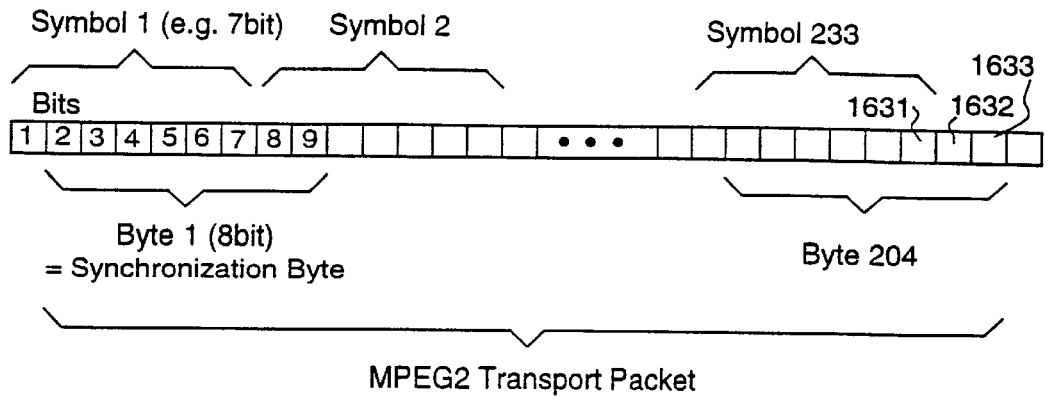
FIG. 2 shows an example of a symbol to byte conversion.
Figure 3:
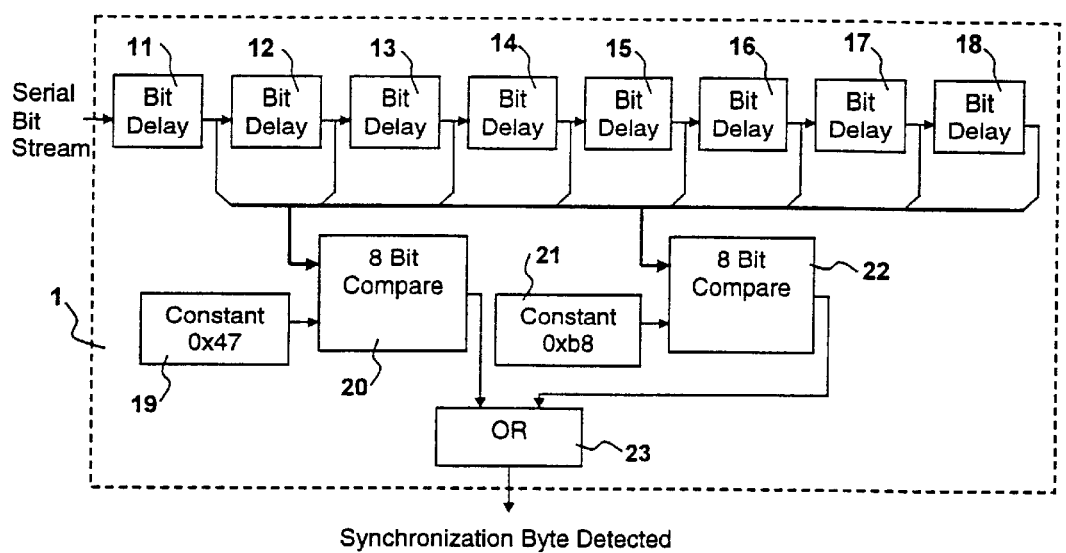
FIG. 3 shows a synchronization pattern detector.
Figure 4:
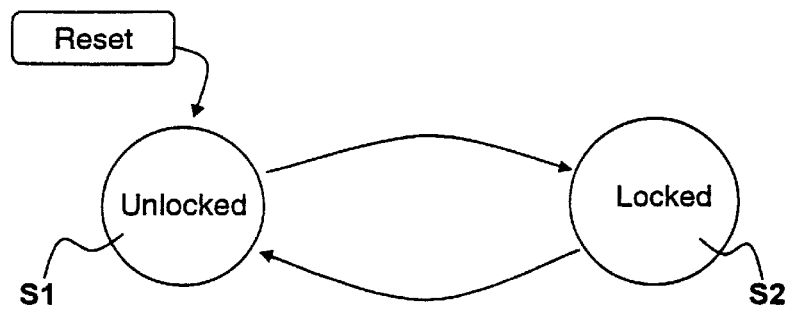
FIG. 4 shows a general state diagram of a synchronization state machine.
Figure 5:
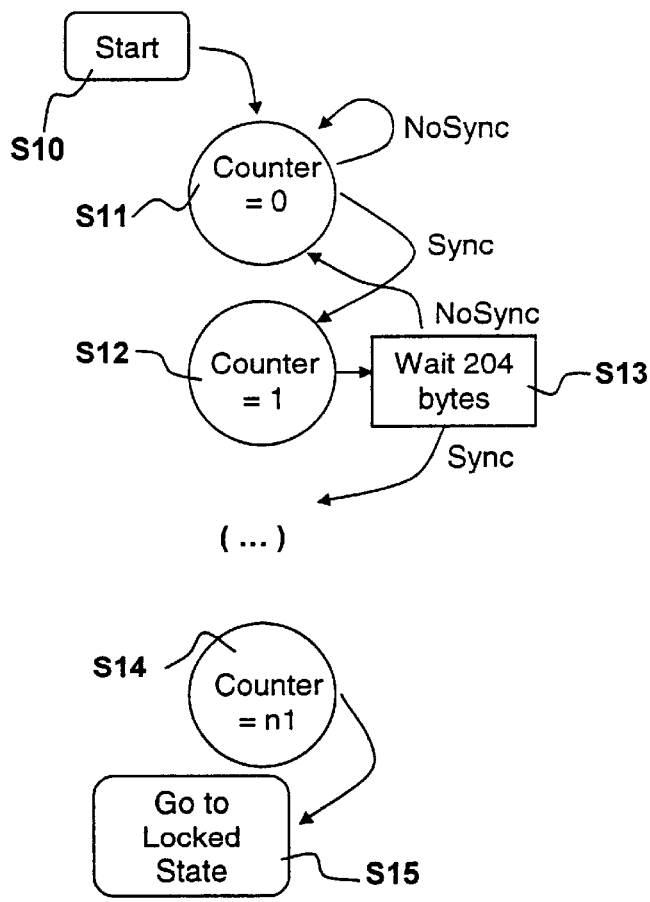
FIG. 5 shows a state diagram of a synchronization state machine in the unlocked state.
Figure 6:
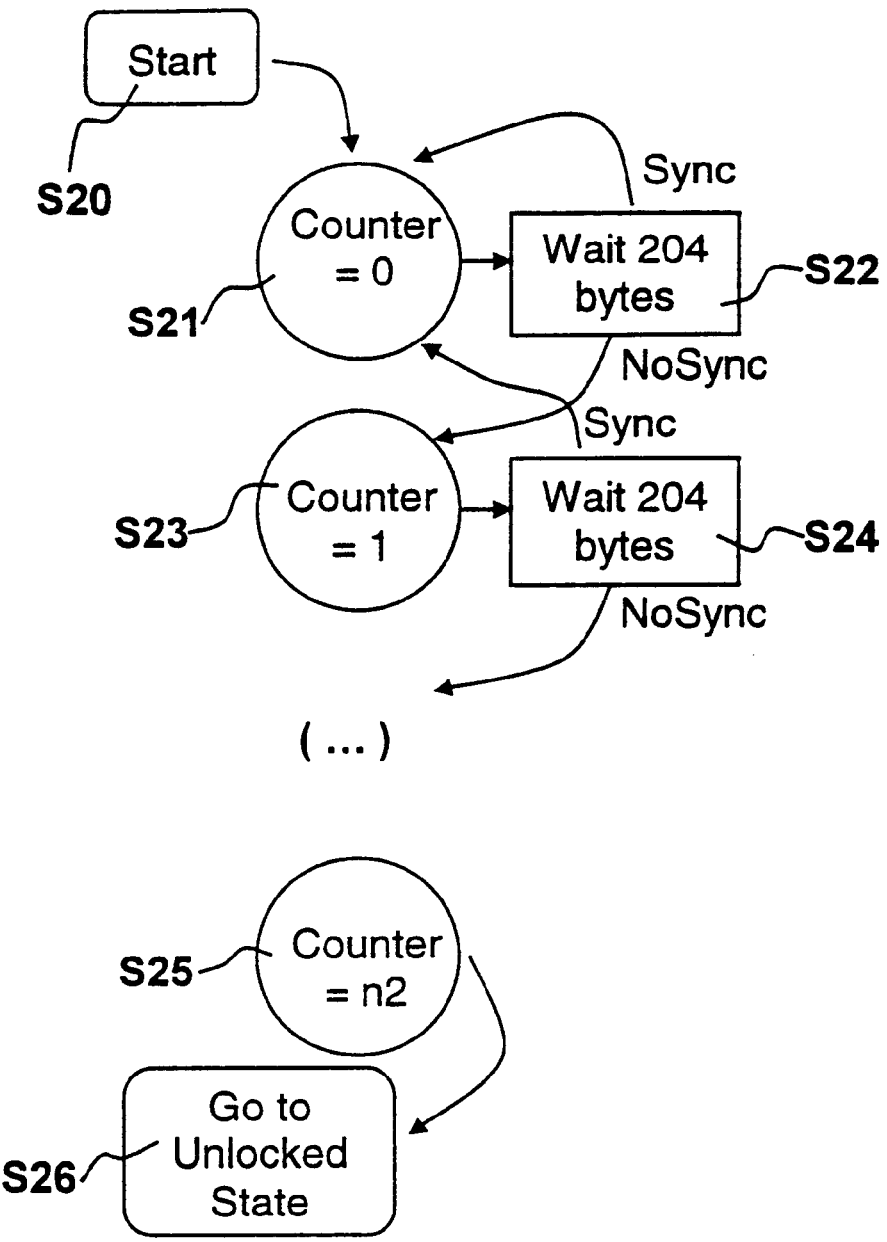
FIG. 6 shows a state diagram of a synchronization state machine in the locked state.

FIG. 2 shows the MPEG transport packet structure. As mentioned above, in integrated DVB channel decoders a stream of 2, 4, 5, 6, 7 or 8 bit symbols must be converted to a stream of bytes and packets. FIG. 2 shows how a stream of symbols which each have a length of 7 bit is converted to a stream of packets. The MPEG transport packet structure uses a fixed packet size of 204 bytes each having a length of 8 bit where the first byte within each packet is a synchronization byte which always has the value 0×47 or the respective inversion 0×b8. Therefore, to convert the stream of symbols into the stream of bytes and packets the symbol boundaries are left out of consideration and the resulting bit stream—which is input to the synchronization byte detector 1—is searched for the synchronization byte on basis of which the byte boundaries and the packet boundaries can be determined. In the shown example the second bit of the first symbol is the first bit of the first byte of the shown MPEG transport packet. Therefore, for 128 QAM where one packet equals to 204 bytes or 1632 bits or 233 symbols+1 bit, the last bit of the 204th byte is the second bit of the 234th symbol, i. e. bit number 1633 when the first shown symbol begins with bit number 1.FIG. 3 shows a synchronization byte detector 1 for the MPEG transport packet structure. Its input stage consists of eight delay circuits 11 to 18 which each have a delay of one bit and which are connected as a delay chain, i. e. the output signal of the first delay circuit 11 which receives the incoming serial bit stream is input to the second delay circuit 12 which output signal is input to the third delay circuit 13 and so forth. The output signals of all eight delay circuits 11 to 18 are input to a first comparator 20 and a second comparator 22 which respectively compare the input 8 bit with a constant corresponding to the synchronization byte or its respective inversion. The first comparator 20 compares the input 8 bit with the value 0×47 which is stored in a memory 19 and the second comparator 22 compares input 8 bit with the constant 0×b8 which is stored in a memory 21. If one of both comparators 20 and 22 determines that the input 8 bit correspond to the constant stored in the respectively connected memory the synchronization pattern or its inverted is detected. Therefore, both comparators 20 and 22 supply their output signal to an or-gate 23 which outputs the control signal, i. e. a synchronization pulse each time one of the comparators has detected a synchronization pattern, i. e. the synchronization byte with the value 0×47 or its inverted 0×b8.This synchronization pulse is supplied to all connected synchronization state machines 2 and $3_1$ to $3_n$ which respectively have two states, namely the locked state or the unlocked state. FIG. 4 shows the state diagram valid for every sync state machine 2 and $3_1$ to $3_n$ which shows that the only possibility of a state change from the unlocked state S1 is a transisition to the locked state S2 and the only possibility to leave the locked state S2 is to return into the unlocked state S1. Furtheron, FIG. 4 shows that a reset of a synchronization state machine forces this synchronization state machine into the unlocked state S1.FIG. 5 shows a state diagram of a respective synchronization state machine in the unlocked state. After the start of the unlocked state in state S10 the synchronization state machine directly achieves the next state S11 in which a counter within the synchronization state machine is set to 0. Furtheron, the synchronization state machine remains in this state S11 until it receives a synchronization pulse from the synchronization byte detector. Upon reception of such a synchronization pulse the synchronization state machine falls into state S12 in which the internal counter is set to 1 whereafter in state S13 a wait of 204 bytes is performed. After this wait within state S13 it is checked whether or not a synchronization pulse occurs at the synchronization pulse input which receives the control signal from the sync byte detector 1. In case no synchronization pulse is present at the synchronization pulse input the synchronization state machine will again resume state S11 in which the counter is set to 0. In case in state S13 a synchronization pulse occurs after the wait of 204 bytes the synchronization state machine will perform a transition to a pair of states similar to states S12 and S13, but with an incremented counter value and with the measure that in case of no synchronization pulse after the waitt of 204 bytes state S12 will be resumed. This return to state S12 is preferred, because there is a rather high probability that the channel falsifies synchronization patterns, since the synchronization byte detector 1 is located before the error correction stage of a receiver. Alternatively to the return to 6 6 step S12 also a return to step 11 can be carried out. Depending on the wanted accuracy and reliability such pairs of states similar to states S12 and S13 may be repeated several times until step S14 is reached as result of a synchronization pulse after the wait of 204 bytes. In step S14 the counter is set to a value n1. After the internal counter has reached the value n1 a transition to step S15 is performed, in which it is triggered that the synchronization state machine leaves the unlocked state S1 and sets itself to the locked state S2.Of course, state S14 can also directly, be reached after step S13 in case n1 equals to 2. In this case only two following synchronization bytes are needed to set the synchronization state machine from the unlocked state S1 into the locked state S2.FIG. 6 shows the state diagram of a respective synchronization state machine in the locked state. After the start state S20 the synchronization state machine directly falls into state S21 in which a counter is set to 0. Directly thereafter, state S22 is reached in which the synchronization state machine waits for 204 bytes and thereafter checks whether a synchronization pulse is present at its synchronization pulse input or not. If a synchronization pulse is present state S21 is again resumed in which the counter is set to 0 whereafter again state S22 is reached. If in state S22 no synchronization pulse is present at the synchronization pulse input of the respective synchronization state machine after the wait of 204 bytes the synchronization state machine performs a transition to state S23 in which the counter is set to 1 before falling into state S24 which corresponds to state S22 apart from the fact that in case of a synchronization pulse after the wait of 204 bytes state S21 is resumed in which the counter is again set to 0. Depending on the wanted accuracy and reliability a chain of pairs of states corresponding to states S23 and S24 can follow in which the counter respectively gets incremented or decremented by one whereafter a wait of 204 bytes is performed to check whether or not a synchronization pulse is present at the synchronization pulse input. If the synchronization state machine has entered state S25 the counter is set to a value n2. After the internal counter has reached the value n2 a transition to state S26 is performed in which the synchronization state machine leaves the locked state S2 and goes into the unlocked state S1.Of course, if n2 equals to 1 step S25 will be carried our directly after no synchronization pulse has been observed in step S22.With the help of FIGS. 5 and 6 it can be seen that a synchronization state machine determines its accuracy and reliability dependent on the number n1 which determines how fast the unlocked state S1 changes into the locked state S2 in case synchronization bytes are transmitted at the same position in regard to the length of a transmission packet and on the number n2 which determines how fast the locked state will be left and the unlocked state will be resumed in case of no reception of the synchronization byte at an expected position in regard to the length of a transmission packet. In this sense the position in regard to the length of a transmission packet can be calculated by a modulo 1632 operation on the value of a bit counter. Preferred values for n1 and n2 in case of a DVB-receiver are n1=5 and n2=8.Of course, it is also thinkable that other strategies than those depicted in FIGS. 5 and 6 and described in connection therewith are carried out to change from the unlocked state S1 to the locked state S2 and vice versa.As it is shown in FIG. 1 the packet synchronization detector according to the present invention comprises one synchronization byte detector 1 and several synchronization state machines 2 and $3_1$ to $3_n$ which respectively maintain their respective synchronization state independently.The sync output Sync of every synchronization state machine indicates the estimated position of the synchronization byte within the length of the transmission packet. When a synchronization state machine is in unlocked state S1 and its internal counter is not 0 the sync will be indicated in complete packet intervals only, since the first matching synchronization pattern produces a synchronization pulse at the output, i. e. the input signal at a synchronization pulse input SyncP is identical to the output signal of the corresponding sync output Sync, increments the internal counter and the synchronization state machine comprises a logic that inhibits the generation of a synchronization pulse at its sync output Sync if a synchronization pulse occurs at its synchronization pulse input SyncP in the middle of an assumed packet.The lock output Lock of every synchronization state machine indicates whether this synchronization state machine has achieved lock or not. The count output Count of every synchronization state machine outputs the value of the internal counter for the respective state which is indicated at the lock output, i. e. values inbetween 0 and n1 in case of the unlocked state S1 and values inbetween 0 and n2 in case of the locked state S2. The synchronization state machine can be forced to enter unlocked state through its reset input Reset as it is mentioned above. The decision stage 4 can reset every synchronization state machine independently to coordinate the operation of all synchronization state machines.Therefore, the decision stage 4 fulfills the following tasks:

1. Determine the lock state of the system. The system is locked if at least one synchronization state machine indicates a locked condition.
2. Determine the synchronization byte position. In locked state the synchronization byte position is the synchronization position of the topmost locked synchronization state machine. This rule results from the fact that normally only one out of the plurality of synchronization state machines can be locked and in case for the remote possibility that there is more than one position where synchronization patterns regularly occur a decision has to be made which synchronization state machine should be assumed to be locked to the correct synchronization pattern. Therefore, the use of another synchronization state machine according to a predefined rule is also possible. In unlocked state the synchronization byte position is not defined. A further preferred embodiment uses the internal counters of every synchronization state machine to determine the best estimate for the synchronization byte position on basis of the synchronization byte position of the synchronization state machine with the highest count value. This embodiment relies on the fact that it is very unlikely for a synchronization pattern that has been detected in the wrong position to occur at the same wrong position one packet later. Therefore, most synchronization state machines will not reach a count value higher than one except they are really locked to the correct synchronization byte position.
3. Ensure that the same synchronization byte position is not being pursued twice. Whenever a synchronization byte machine indicates a synchronization pulse the decision stage 4 checks if this pulse comes from another state machine also. If this is the case, the synchronization state machine with the lower internal counter value is being reset. If the counter values are identical, all such machines except for the topmost synchronization state machine are reset.
4. Coordinate operations in locked state. During lock state all synchronization state machines are held in reset state except for the one that has been elected in 2.The decision stage 4 outputs a lock signal in case the system is locked to a synchronization pattern and a sync signal which indicates the synchronization byte position.

What is claimed is:
1. Packet synchronization detector for an incoming digital signal which includes a regularly repeated predetermined synchronization pattern which repetition rate defines the length of one transmission packet, comprising:

a synchronization pattern detector that outputs a control signal whenever the incoming digital signal carries one predetermined synchronization pattern, a synchronization state machine that determines whether or not one detected synchronization pattern with a first position within the length of one transmission frame has the correct repetition rate to determine whether or not lock has been achieved on basis of said first position of said synchronization pattern within the transmission frame, characterized by at least one further synchronization state machine that respectively determines whether or not one further detected synchronization pattern with a respective further position within the length of one transmission frame has the correct repetition rate to determine whether or not lock has been achieved on basis of said respective further position of said synchronization pattern within the transmission frame.

2. Packet synchronization detector according to claim 1, characterized by a decision stage to determine whether or not the system is in a locked state on basis of lock detected output signals of all synchronization state machines.

3. Packet synchronization detector according to claim 2, characterized in that said decision stage determines whether two or more synchronization state machines are locked to a synchronization pattern at the same position on basis of a respective position signal (sync) indicating the position within the transmission frame of the synchronization pattern the respective synchronization state machine is locked to which is output by each respective synchronization state machine and in that said decision stage resets all but one of the synchronization state machines that are locked to said synchronization pattern at the same position within the transmission frame.

4. Packet synchronization detector according to claim 2, characterized in that said decision stage determines which of several synchronization state machines that are locked to synchronization patterns at different positions within the transmission frame has the best estimate for the true synchronization pattern position on basis of a respective counter indicating how often a respective synchronization pattern has been detected by the synchronization pattern detector at a respective position within the transmission frame.

5. Packet synchronization detector according to claim 1, characterized by a total number of 16 synchronization state machines.

6. Use of a packet synchronization detector according to claim 1 in a DVB or a DAB receiver.

7. Method to determine the lock-in to a regularly repeated predetermined synchronization pattern with an incoming digital signal, comprising the detection of every incoming predetermined synchronization pattern, characterized by the determination for every detected synchronization pattern with a respective predetermined position within the transmission frame whether it respectively has the correct repetition rate;

wherein the determination of which of the synchronization patterns repeatedly received at different positions within the transmission frame has the best estimate to be the true synchronization pattern on basis of a respective counter indicating the number of times a respective synchronization pattern has been received at a respective position within the transmission frame.

* * * * *